(12) United States Patent
Guy et al.

(10) Patent No.: US 10,487,213 B2
(45) Date of Patent: Nov. 26, 2019

(54) PROCESS FOR THE PREPARATION OF PRECIPITATED SILICAS, PRECIPITATED SILICAS AND THEIR USES, IN PARTICULAR FOR THE REINFORCEMENT OF POLYMERS

(71) Applicant: RHODIA OPERATIONS, Paris (FR)

(72) Inventors: Laurent Guy, Rillieux-la-Pape (FR); Sylvaine Neveu, Paris (FR); Cédric Boivin, Chasselay (FR); Eric Perin, Villefranche sur Saône (FR); Anne-Laure Pinault, Fresnes (FR)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/123,545

(22) PCT Filed: Feb. 26, 2015

(86) PCT No.: PCT/EP2015/053997
§ 371 (c)(1),
(2) Date: Sep. 2, 2016

(87) PCT Pub. No.: WO2015/132120
PCT Pub. Date: Sep. 11, 2015

(65) Prior Publication Data
US 2017/0073521 A1 Mar. 16, 2017

(30) Foreign Application Priority Data
Mar. 5, 2014 (EP) .................................... 14305319

(51) Int. Cl.
| | |
|---|---|
| *B32B 5/16* | (2006.01) |
| *C09C 1/30* | (2006.01) |
| *C01B 33/193* | (2006.01) |
| *C08K 3/36* | (2006.01) |
| *B60C 1/00* | (2006.01) |
| *C08L 9/06* | (2006.01) |

(52) U.S. Cl.
CPC .............. *C09C 1/3063* (2013.01); *B60C 1/00* (2013.01); *C01B 33/193* (2013.01); *C08K 3/36* (2013.01); *C08L 9/06* (2013.01); *C09C 1/30* (2013.01); *C09C 1/3045* (2013.01); *C09C 1/3072* (2013.01); *C01P 2006/12* (2013.01); *C01P 2006/90* (2013.01); *C08K 2201/006* (2013.01); *C08L 2205/02* (2013.01)

(58) Field of Classification Search
CPC .......... C08K 3/36; C08K 5/092; C01B 33/18; C01B 33/193; C01P 2006/12
USPC .................................................. 428/402, 403
See application file for complete search history.

(56) References Cited

U.S. PATENT DOCUMENTS

| | | | | |
|---|---|---|---|---|
| 4,198,491 | A * | 4/1980 | Blount | ................... B01J 31/123 525/56 |
| 5,922,298 | A | 7/1999 | Boyer et al. | |
| 7,566,433 | B2 | 7/2009 | Stenzel et al. | |
| 9,862,810 | B2 * | 1/2018 | Boivin | ................... C01B 33/193 |
| 2003/0082090 | A1 | 5/2003 | Blume et al. | |
| 2004/0079504 | A1 * | 4/2004 | Lafon | ................... C01B 33/193 162/181.6 |
| 2009/0214449 | A1 * | 8/2009 | Valero | ................... C01B 33/193 424/55 |
| 2010/0292386 | A1 * | 11/2010 | Okel | ........................ B60C 1/00 524/492 |
| 2015/0252172 | A1 * | 9/2015 | Boivin | ................... C08K 5/548 524/112 |

FOREIGN PATENT DOCUMENTS

| | | |
|---|---|---|
| EP | 1295850 A1 | 3/2003 |
| FR | 2886285 A1 | 12/2006 |
| WO | 2010129518 A1 | 11/2010 |

OTHER PUBLICATIONS

Vorsina et al, Mechanochemical Interaction of Silicon Dioxide with Organic Acids, Chem. for Sustainable Development, 19 (2011) 447-455.*

* cited by examiner

Primary Examiner — Hoa (Holly) Le

(57) ABSTRACT

A precipitated silica having a CTAB specific surface in the range of from 50 to 300 m²/g; a BET/CTAB specific surface ratio equal to or greater than 1.3 and comprising at least one polycarboxylic acid.

14 Claims, No Drawings

PROCESS FOR THE PREPARATION OF PRECIPITATED SILICAS, PRECIPITATED SILICAS AND THEIR USES, IN PARTICULAR FOR THE REINFORCEMENT OF POLYMERS

CROSS-REFERENCE TO RELATED APPLICATIONS

The present application is a U.S. national phase entry under U.S.C. § 371 of International Application No. PCT/EP2015/053997, filed on 26 Feb. 2015, which claims priority to European application No. 14305319.7 filed on 5 Mar. 2014, the entire content of these applications being incorporated herein by reference for all purposes.

The present invention relates to readily dispersible precipitated silica, to a process for the manufacture thereof and the use thereof in elastomer or vulcanizable rubber mixtures.

Precipitated silica has long been used as a reinforcing filler for elastomers, in particular for use in tires.

According to a general process, precipitated silica is prepared by means of a reaction whereby a silicate, such as the silicate of an alkaline metal, for instance sodium silicate, is precipitated with an acidifying agent, such as sulfuric acid, followed by separation of the resulting solid by filtration. A filter cake is thus obtained which is generally submitted to a liquefaction operation before being dried, generally by atomization. Several methods can be employed for the precipitation of silica: notably, the addition of an acidifying agent to a sediment of the silicate, or simultaneous addition, partial or total, of an acidifying agent and of the silicate to water or to a silicate sediment already present in the vessel In order to produce optimal reinforcing properties from a filler, the latter must be present in the elastomer matrix in a form which is as finely divided as possible and distributed as homogeneously as possible.

When incorporating precipitated silica in polymers, it is also important to optimize the viscosity behaviour during compounding and the dynamic properties of the product without detrimentally influencing the mechanical properties of the blend of polymer and filler.

Despite the efforts to improve the properties of the precipitated silica for use in elastomer compositions in the prior art, the products are still not fully satisfactory and further improvement is desirable.

It was thus an object of the present invention to provide precipitated silica for use in elastomer compositions, in particular elastomer compositions which are used in the production of tires which provide a good balance of mechanical and dynamical properties, in particular as far as rheological behaviour during compounding is concerned. This object is achieved with the precipitated silica having: a CTAB specific surface in the range of from 50 to 300 $m^2/g$; a BET/CTAB specific surface ration equal to or greater than 1.3; and a content of polycarboxylic acid and/or carboxylate, expressed as total carbon content, of at least 0.15 wt %.

Preferred embodiments are set forth in the dependent claims.

The invention furthermore concerns a process for the manufacture of a precipitated silica in accordance with the present invention, the use of the silica in accordance with the present invention in elastomer compositions, in particular for tire applications, and articles of manufacture obtained from such compositions.

An object of the present invention is a precipitated silica having a CTAB specific surface in the range of from 50 to 300 $m^2/g$, a BET/CTAB specific surface ratio equal to or greater than 1.3 and comprising at least one polycarboxylic acid.

Object of the invention is a precipitated silica having a CTAB specific surface in the range of from 50 to 300 $m^2/g$, a BET/CTAB specific surface ratio equal to or greater than 1.3 and a content of polycarboxylic acid and/or carboxylate groups, expressed as total carbon content, of at least 0.15 wt %.

Mixtures of polycarboxylic acids can be used in accordance with further preferred embodiments.

The precipitated silica according to the invention exhibits a total content (C) of polycarboxylic acids or their mixtures and/or of the corresponding carboxylates, expressed as total carbon, of at least 0.15% by weight, in particular of at least 0.20% by weight. The content (C) of polycarboxylic acids and/or corresponding carboxylates can be of at least 0.25% by weight, in particular of at least 0.30% by weight, for example of at least 0.35% by weight, indeed even of at least 0.45% by weight. The content (C) of polycarboxylic acids and/or corresponding carboxylates, expressed as total carbon is not particularly limited, although it typically does not exceed 10.00% weight, in particular it does not exceed 5.00% by weight.

In any of the polycarboxylic acids, a part or the totality of the carboxylic acid functional groups may be in the form of a carboxylic acid derivative, namely in the form of an anhydride, ester, or salt, for instance the salt of an alkaline metal (e.g. sodium or potassium) or an ammonium salt. The term "carboxylate" will be used hereinafter to indicate the derivatives of the carboxylic acid functional groups as defined above.

The total content of polycarboxylic acids or their mixtures and/or of the corresponding carboxylates, denoted (C), expressed as total carbon, can be measured using a carbon/sulfur analyzer, such as the Horiba EMIA 320 V2. The principle of the carbon/sulfur analyzer is based on the combustion of a solid sample in a stream of oxygen in an induction furnace (adjusted to approximately 170 mA) and in the presence of combustion accelerators (approximately 2 grams of tungsten (in particular Lecocel 763-266) and approximately 1 gram of iron).

The carbon present in the sample to be analyzed (weight of approximately 0.2 gram) combines with the oxygen to form $CO_2$, CO. These gases are subsequently analyzed by an infrared detector.

The moisture from the sample and the water produced during these oxidation reactions is removed by passing over a cartridge comprising a dehydrating agent (magnesium perchlorate) in order not to interfere with the infrared measurement.

The result is expressed as percentage by weight of element carbon.

The presence of the polycarboxylic acid(s) and/or of the corresponding carboxylates at the surface of the inventive precipitated silica can be determined by the presence of shoulders characteristic of the C—O and C=O bonds, visible in the infrared spectra, obtained in particular by surface (transmission) infrared or diamond-ATR infrared (in particular between 1540 and 1590 $cm^{-1}$ and between 1380 and 1420 $cm^{-1}$ for C—O, and between 1700 and 1750 $cm^{-1}$ for C=O).

The surface infrared analysis (by transmission) may be carried out on a Bruker Equinox 55 spectrometer on a pellet of pure product. The pellet is typically obtained after grinding the silica as is in an agate mortar and pelleting at 2 $T/cm^2$ for 10 seconds. The diameter of the pellet is generally 17 mm. The weight of the pellet is between 10 and 20 mg. The pellet thus obtained is placed in the high vacuum chamber ($10^{-7}$ mbar) of the spectrometer for one hour at ambient temperature before the analysis by transmission. Acquisition takes place under high vacuum (acquisition conditions: from 400 $cm^{-1}$ to 6000 $cm^{-1}$; number of scans: 100; resolution: 2 $cm^{-1}$).

The diamond-ATR analysis, may be carried out on a Bruker Tensor 27 spectrometer, and it consists in depositing, on the diamond, a spatula tip of pre-ground silica in an agate mortar and in then exerting a pressure. The infrared spectrum is recorded on the spectrometer in 20 scans, from 650 $cm^{-1}$ to 4000 $cm^{-1}$. The resolution is 4 $cm^{-1}$.

The term "polycarboxylic acid" is used herein to refer to carboxylic acids comprising at least two carboxylic acid functional groups. The expression "carboxylic acid functional group" is used herein in its customary meaning, to refer to the —COOH functional group.

Polycarboxylic acids suitable for the precipitated silica of the invention may have two, three, four or even more than four carboxylic acid functional groups. Preferably, the polycarboxylic acids suitable for the precipitated silica of the invention are selected from the group consisting of the dicarboxylic acids and the tricarboxylic acids.

Suitable polycarboxylic acids are linear or branched, saturated or unsaturated, aliphatic polycarboxylic acids having from 2 to 20 carbon atoms and aromatic polycarboxylic acids. The polycarboxylic acids may optionally comprise hydroxy functional groups and/or halogen atoms.

Aliphatic polycarboxylic acids may optionally comprise heteroatoms in the main chain, e.g. N, S.

Typically, the polycarboxylic acid is selected from the group consisting of the linear or branched, saturated or unsaturated, aliphatic polycarboxylic acids and aromatic polycarboxylic acids having from 2 to 16 carbon atoms.

Among the aliphatic polycarboxylic acids mention may be made of the linear polycarboxylic acids, saturated or unsaturated, having from 2 to 14 carbon atoms, preferably having from 2 to 12 carbon atoms. Suitable polycarboxylic acids may have 2, 3, 4, 5, 6, 7, 8, 9, 10, 11 or 12 carbon atoms. Suitable polycarboxylic acids may advantageously have 4, 5, 6, 7, 8, 9 or 10 carbon atoms, preferably 4, 5, 6, 7, or 8 carbon atoms. For instance the polycarboxylic acid may have 4, 5 or 6 carbon atoms.

Notable, non-limiting examples of suitable linear aliphatic polycarboxylic acids are the acids selected from the group consisting of oxalic acid, malonic acid, tricarballylic acid, succinic acid, glutaric acid, adipic acid, pimelic acid, suberic acid, azelaic acid, sebacic acid.

Among branched polycarboxylic acids mention may be made of methylsuccinic acid, ethylsuccinic acid, oxalosuccinic acid, methyladipic acid, methylglutaric acid, dimethylglutaric acid. For the avoidance of doubt, the expression "methylglutaric acid" is used herein to indicate both 2-methylglutaric acid and 3-methylglutaric acid, as well as mixtures of the two isomers in any proportion. The expression "2-methylglutaric acid" is used herein to indicate both the (S) and (R) forms of the compound as well as their racemic mixture.

Among the unsaturated polycarboxylic acids mention may be made of maleic acid, fumaric acid, itaconic acid, muconic acid, aconitic acid, traumatic acid, glutaconic acid.

Among polycarboxylic acids comprising hydroxyl functional groups mention may be made of malic acid, citric acid, isocitric acid, tartaric acid.

Aromatic polycarboxylic acids typically have from 6 to 20 carbon atoms. Among the aromatic polycarboxylic acids, mention may be made of the phthalic acids, namely phthalic acid, orthophthalic acid and isophthalic acid, trimesic acid, trimellitic acid.

Preferably the polycarboxylic acid for the invention is selected from the group consisting of oxalic acid, malonic acid, tricarballylic acid, succinic acid, glutaric acid, adipic acid, pimelic acid, suberic acid, azelaic acid, sebacic acid, methylsuccinic acid, ethylsuccinic acid, methyladipic acid, methylglutaric acid, dimethylglutaric acid, malic acid, citric acid, isocitric acid and tartaric acid.

The polycarboxylic acid may be conveniently selected from the group consisting of adipic acid, succinic acid, ethylsuccinic acid, glutaric acid, methylglutaric acid, oxalic acid and citric acid.

Alternatively, the polycarboxylic acid may be selected from the group consisting of oxalic acid, malonic acid, tricarballylic acid, succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid, tartaric acid. Preferably, the polycarboxylic acid may be selected from the group consisting of oxalic acid, malonic acid, succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid and tartaric acid. Even more preferably the polycarboxylic acid may be selected from the group consisting of succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid, citric acid, isocitric acid, tartaric acid.

The polycarboxylic acid may be selected from the group consisting of succinic acid, glutaric acid, adipic acid, methyladipic acid, pimelic acid, suberic acid, azelaic acid, sebacic acid, methylsuccinic acid, ethylsuccinic acid, methylglutaric acid, dimethylglutaric acid, malic acid.

In accordance with a preferred embodiment, the precipitated silica of the present invention comprises at least two polycarboxylic acids as defined above, that is a mixture of at least two polycarboxylic acids. The mixture may comprise two, three, four or even more than four polycarboxylic acids. Typically, the mixture comprises two polycarboxylic acids. Preferably, the mixture comprises three polycarboxylic acids as defined above. More preferably, the mixture comprises three polycarboxylic acids selected from the group consisting of the dicarboxylic acids and the tricarboxylic acids.

In an advantageous embodiment, the mixture comprises three polycarboxylic acids, preferably three dicarboxylic acids. Typically, the mixture consists of three dicarboxylic acids, although impurities may be present in an amount typically not exceeding 2.00 wt % of the total mixture of polycarboxylic acids.

In a first aspect of said embodiment, the mixture comprises adipic acid, glutaric acid and succinic acid. The three acids may be present in the mixture in any proportion.

Typically, the amount of adipic acid in the mixture is equal to or greater than 15.00 wt %, preferably equal to or greater than 20.00 wt %; the amount of adipic acid is generally equal to or less than 35.00 wt %, preferably equal to less than 30.00 wt %.

The amount of glutaric acid is typically equal to or greater than 40.00 wt %, preferably equal to or greater than 45.00 wt % and equal to or less than 65.00 wt %, preferably equal to or less than 60.00 wt %.

The amount of succinic acid in the mixture is equal to or greater than 13.00 wt %, preferably equal to or greater than 15.00 wt % and equal to or less than to 28.00 wt %, preferably equal to or less than 25.00 wt %. The percentages are referred to the total amount of polycarboxylic acids in the mixture. Such a mixture may advantageously be obtained from a process for the manufacture of adipic acid.

In a second aspect of said embodiment, the mixture comprises methylglutaric acid, ethylsuccinic acid and adipic acid. The three acids may be present in the mixture in any proportion.

Preferably, the mixture comprises a major proportion of methylglutaric acid with respect to the total combined weight of ethylsuccinic acid and adipic acid. Typically, the amount of methylglutaric acid in the mixture is at least 50.00 wt %; preferably it is equal to or greater than 60.00 wt %, more preferably equal to or greater than 80.00 wt %, more preferably equal to or greater than 90.00 wt %. The amount of methylglutaric acid in the mixture is equal to or less than 97.00 wt %, preferably equal to less than 96.00 wt %, more preferably equal to less than 95.50 wt %.

The amount of ethylsuccinic acid is generally equal to or greater than 3.00 wt %, preferably equal to or greater than 3.50 wt %, more preferably equal to or greater than 3.90 wt % and equal to or less than 20.00 wt %, preferably equal to or less than 12.00 wt %, more preferably equal to or less than 9.70 wt %.

The amount of adipic acid in the mixture is equal to or greater than 0.05, preferably equal to or greater than 0.08 wt %, more preferably equal to or greater than 0.10 wt % and equal to or less than to 20.00 wt %, preferably equal to or less than 10.00 wt %, more preferably equal to or less than 5.00 wt %.

The methylglutaric acid in the mixture may be 2-methylglutaric acid. Alternatively, the methylglutaric acid may be 3-methylglutaric acid. Still alternatively, the methylglutaric acid in the mixture may be a mixture of 2-methylglutaric acid and 3-methylglutaric acid, in any proportion of the two.

The mixture of polycarboxylic acids defined above may advantageously be obtained by hydrolysis, acid or basic, of a mixture comprising methylglutaronitrile, ethylsuccinonitrile and adiponitrile. Said mixture may conveniently derive from the process of preparation of adiponitrile by hydrocyanation of butadiene as known in the art.

Thus, in a first embodiment, the mixture of polycarboxylic acids used in the precipitated silica of the invention may comprise:
  methylglutaric acid, typically from 60.00 to 96.00 wt %, for instance from 90.00 to 95.50 wt %;
  ethylsuccinic anhydride, typically from 3.50 to 20.00 wt %, for instance from 3.90 to 9.70 wt %; and
  adipic acid, typically from 0.05 to 20.00 wt %, for instance from 0.10 to 0.30 wt %.

In an alternative, advantageous composition the mixture of polycarboxylic acids used in the invention may comprise:
  methylglutaric acid, typically from 10.00 to 50.00 wt %, for instance from 25.00 to 40.00 wt %;
  methylglutaric anhydride, typically from 40.00 to 80.00 wt %, for instance from 55.00 to 70.00 wt %;
  ethylsuccinic anhydride, typically from 3.50 to 20.00 wt %, for instance from 3.90 to 9.70 wt %; and
  adipic acid, typically from 0.05 to 20.00 wt %, for instance from 0.10 to 0.30 wt %.

In the above composition methylglutaric anhydride may be 2-methylglutaric anhydride, 3-methylglutaric anhydride or a mixture of the two.

The polycarboxylic acids used in the invention may optionally be neutralised, for instance by reaction with a base such as NaOH or KOH, before being used in the inventive process. This allows modifying the pH of the resulting silica.

The precipitated silica in accordance with the present invention has a CTAB specific surface in the range of from 50 to 300 $m^2/g$. The CTAB specific surface is typically in the range from 150 to 250 $m^2/g$, preferably from 180 to 220 $m^2/g$.

The CTAB specific surface is the external surface of the precipitated silica, which can be determined according to the standard NF ISO 5794-1, Appendix G (June 2010).

The precipitated silica in accordance with the present invention has a BET specific surface in the range of from 45 to 600 $m^2/g$, such as between 170 and 380 $m^2/g$, preferably between 220 and 340 $m^2/g$.

The BET specific surface is determined according to the Brunauer-Emmett-Teller method described in The Journal of the American Chemical Society, Vol. 60, page 309, February 1938, and corresponding to the standard NF ISO 5794-1, Appendix D (June 2010).

In accordance with an aspect of the present invention, the BET value of the precipitated silica will be a value such that the ratio BET specific surface to CTAB specific surface is equal to or greater than 1.3. The BET/CTAB specific surface ratio is from 1.3 to 2.0, more particularly from 1.4 to 1.8.

In accordance with another aspect of the present invention the relative breadth Y of pore size distribution of the precipitated silica of the present invention is less than or equal 3.5, for instance from 2.0 to 3.5, more particularly from 2.8 to 3.5.

A description of the method used to determine the relative breadth Y of pore size distribution can be found in U.S. Pat. No. 7,566,433 B2 in column 3, lines 1-31, and column 16, lines 6-63, which disclosure is incorporated herein in its entirety by reference. The pore volume of precipitated silicas is determined by mercury porosimetry. The method is based on Hg (mercury) intrusion to DIN 66133 (with surface tension of 480 mN/m and with a contact angle of 140°).

In an embodiment of the invention, the precipitated silica can exhibit a total aluminum (Al) content of at least 0.20% by weight, typically of at least 0.30% by weight, in particular of at least 0.33% by weight. It generally exhibits an aluminum (Al) content of less than 1.00% by weight, in particular of at most 0.50% by weight, for example of at most 0.45% by weight.

The content of aluminum, denoted (Al), can be determined by wavelength dispersive X-ray fluorescence, for example with a Panalytical 2400 spectrometer or, preferably, with a Panalytical MagixPro PW2540 spectrometer. The aluminum determination by X-ray fluorescence is typically carried out on homogeneous powder of the precipitated silica, obtained for instance by grinding granules of the precipitated silica. The powder is analyzed as is in a vessel having a diameter of 40 mm with a polypropylene film with a thickness of 6 μm, under a helium atmosphere, at an irradiation diameter of 37 mm, the amount of silica analyzed is 9 $cm^3$. The measurement of the aluminum content, is obtained from the Kα line (2θ angle=145°, PE002 crystal, 550 μm collimator, gas flow detector, rhodium tube, 32 kV and 125 mA). The intensity of this line is proportional to the aluminum content.

In an additional embodiment of the invention, the inventive precipitated silica is characterized in that it has:
  a CTAB specific surface in the range of from 50 to 300 $m^2/g$, a BET/CTAB specific surface ratio equal to or greater than 1.3; and a content (C) of polycarboxylic acid and/or corresponding carboxylate, expressed as total carbon, of at least 0.15% by weight, in particular of at least 0.20% by weight;

a relative breadth Y of pore size distribution of less than or equal to 3.5; and optionally, a content of aluminum (Al) of at least 0.30% by weight.

A first preferred precipitated silica in accordance with the present invention has a BET specific surface in the range of from 120 to 300 m$^2$/g, a CTAB specific surface of from 100 to 300 m$^2$/g, a BET/CTAB specific surface ratio from 1.3 to 1.5 and a content (C) of polycarboxylic acid and/or corresponding carboxylate, expressed as total carbon, of at least 0.15% by weight, in particular of at least 0.20% by weight.

A particularly preferred precipitated silica is characterized by the following set of parameters: BET specific surface from 200 to 300 m$^2$/g, preferably from 220 to 280 m$^2$/g; CTAB specific surface from 150 to 250 m$^2$/g, preferably from 180 to 240 m$^2$/g; a BET/CTAB specific surface ratio from 1.3 to 1.5; and a content (C) of polycarboxylic acid and/or corresponding carboxylate, expressed as total carbon, of at least 0.15% by weight, in particular of at least 0.20% by weight.

Another object of the present invention is a process for the production of a precipitated silica according to the present teachings, the process comprising the steps of:

(a) providing an initial solution of aqueous alkali metal silicate having a desired alkaline pH;

(b) heating said initial solution to the desired reaction temperature;

(c) simultaneously adding an acidifying agent and additional alkali metal silicate solution with agitation to the initial solution while maintaining the alkaline pH and temperature at the desired values;

(d) stopping the addition of alkali metal silicate to the reactor while continuing the addition of acidifying agent to adjust the pH of the resulting silica suspension to a desired acid value;

(e) submitting said silica suspension to filtration to provide a filter cake;

(f) submitting said filter cake to a liquefaction step, optionally in the presence of an aluminum compound, to obtain a suspension of precipitated silica; and (g) optionally, drying the precipitated silica obtained after the liquefaction step;

wherein at least one polycarboxylic acid is added to the filter cake during or after the liquefaction step.

The choice of the acidifying agent and of the silicate used in steps (a) to (d) of the process is made in a way well known in the art. Use is generally made, as acidifying agent, of a strong inorganic acid, such as sulfuric acid, nitric acid or hydrochloric acid. Alternatively, an organic acid, such as acetic acid, formic acid or carbonic acid may also be used in this step of the process.

The acidifying agent can be dilute or concentrated; the acid concentration can be between 0.4 and 36.0N, for example between 0.6 and 1.5N.

In particular, in the case where the acidifying agent is sulfuric acid, its concentration can be between 40 and 180 g/l, for example between 60 and 130 g/l.

Any common form of silicate may be used in the process, such as metasilicates, disilicates and advantageously an alkali metal silicate, in particular sodium or potassium silicate.

The silicate initially present in the vessel conventionally has a concentration (expressed in terms of SiO$_2$) of between 40 and 330 g/l, for example between 60 and 300 g/l.

Preferably, the silicate is sodium silicate. When sodium silicate is used, it generally exhibits a ratio SiO$_2$/Na$_2$O by weight of between 2.0 and 4.0, in particular between 2.4 and 3.9, for example between 3.1 and 3.8.

The amount of silicate initially present in the vessel typically represents only a portion of the total amount of silicate involved in the reaction.

The pH of the initial solution of alkali metal silicate is alkaline, that is at least 8.0. The pH is typically at least 9.0.

An electrolyte may be initially present in the vessel with the silicate. The term "electrolyte" is understood in the present specification as normally accepted, that is to say that it means any ionic or molecular substance which, when in solution, decomposes or dissociates to form ions or charged particles. As suitable electrolytes mention may be made of alkali metals and alkaline earth metals salts, in particular the salt of the starting silicate metal and of the acidifying agent, for example sodium chloride in the case of the reaction of a sodium silicate with hydrochloric acid or, preferably, sodium sulfate in the case of the reaction of a sodium silicate with sulfuric acid.

During step (c) of the process the pH is generally controlled to remain at or above 9.0. Typically at the end of this step the pH is at a value of from 9.0 to 9.7. After the addition of all of the silicate is carried out the addition of the acidifying agent continues until a pH of from 2.5 to 5.0 is reached, typically about 4.0.

The resulting silica suspension is then filtered from the reaction mixture to provide a filter cake.

A suitable process for the manufacture of precipitated silica having the set of properties recited in the claims is described in WO2010129518A1, in particular in Part 1 of the Examples, which is incorporated herewith in its entirety by reference for further details.

According to the process of the invention, the filter cake undergoes a liquefaction step during which, or after which, at least one polycarboxylic acid, or a mixture thereof is added to the filter cake. The liquefaction step is carried out with or without the addition of an aluminum compound to the filter cake. The filter cake thus obtained, usually exhibits a solids content of at most 30 wt %, preferably of at most 25 wt %.

The amount of the at least one polycarboxylic acid calculated with respect to the amount of silica (expressed in terms of SiO$_2$) in the product at the time of addition, is generally of at least 0.50 wt %, even of at least 0.60 wt %, preferably of at least 0.70 wt %, more preferably at least 0.75 wt %. The amount of the at least one polycarboxylic acid typically does not exceed 2.50 wt %, preferably 2.00 wt %, more preferably 1.75 wt %, and even more preferably it does not exceed 1.50 wt %, with respect to the amount of silica (expressed in terms of SiO$_2$) in the product at the time of addition. The amount of the at least one polycarboxylic acid may typically be in the range from 0.50 wt % to 2.00 wt %, even from 0.60 wt % to 1.75 wt % with respect to the amount of silica (expressed in terms of SiO$_2$) in the filter cake.

The aforementioned amounts of polycarboxylic acid(s) added to the filter cake during or after the liquefaction step yield the amount of polycarboxylic acid and/or carboxylate groups in the final product of at least 0.15 wt % as required in accordance with the present teachings.

The term "liquefaction" is intended herein to indicate a process wherein a solid, namely the filter cake, is converted into a fluid-like mass. The expressions "liquefaction step", "liquefaction operation" or "disintegration" are interchangeably intended to denote a process wherein the filter cake is transformed into a flowable suspension, which can then be easily dried. After the liquefaction step the filter cake is in a flowable, fluid-like form and the precipitated silica is in suspension.

The liquefaction step may generally comprise a mechanical treatment which results in a reduction of the granulometry of the silica in suspension. Said mechanical treatment may be carried out by passing the filter cake through a colloidal-type mill or a ball mill. The mixture which is obtained after the liquefaction step is hereinafter referred to as "suspension of precipitated silica". The at least one polycarboxylic acid may be added to the filter cake during or after the mechanical treatment has taken place. The filter cake subjected to the liquefaction step may be a mixture of more than one filter cake, each one obtained from the filtration of a silica suspension, or a part of the silica suspension, obtained from the precipitation step. The filter cake may optionally be washed or rinsed before the liquefaction step.

The liquefaction step may comprise the addition to the filter cake of an aluminum compound. Depending on the intended final use, the addition of an aluminum compound may be advantageous or not.

According to a first embodiment of the process of the invention, no aluminum compound is added to the filter cake during the liquefaction step.

In an alternative embodiment of the invention, the liquefaction step is carried out by subjecting the filter cake to a chemical action by addition of an aluminum compound, for example sodium aluminate, and of at least one polycarboxylic acid, preferably coupled with a mechanical action as described above.

In a first aspect of said alternative embodiment, the aluminum compound and the at least one polycarboxylic acid are simultaneously added to the filter cake during the liquefaction step (co-addition).

In a second aspect, during the liquefaction step, the aluminum compound is added to the filter cake prior to the addition of the at least one polycarboxylic acid.

In a third, preferred, aspect, the liquefaction step is carried out by subjecting the filter cake to a chemical action by addition of an aluminum compound, preferably coupled with a mechanical action as described above. In this third aspect, at least one polycarboxylic acid is added, after the liquefaction step, to the suspension of precipitated silica, that is to the disintegrated filter cake.

The aluminum compound is typically chosen from alkali metal aluminates. In particular, the aluminum compound is sodium aluminate.

When an aluminum compound is added to the filter cake during the liquefaction operation the amount is generally such that the ratio of aluminum compound to amount of silica, expressed as $SiO_2$, present in the filter cake is between 0.20% and 0.75%, preferably between 0.20% and 0.50% by weight, more preferably between 0.25% and 0.45% by weight.

The precipitated silica suspension obtained at the end of the liquefaction step is typically dried. Drying may be carried out using any means known in the art. Preferably, drying is carried out by spray drying. For this purpose, any suitable type of spray dryer may be used, especially a turbine spray dryer or a nozzle spray dryer (liquid-pressure or two-fluid nozzle). In general, when the filtration is carried out by means of a filter press, a nozzle spray dryer is used, and when the filtration is carried out by means of a vacuum filter, a turbine spray dryer is used.

When a nozzle spray dryer is used, the precipitated silica is usually in the form of approximately spherical beads.

After drying, a milling step may then be carried out on the recovered product. The precipitated silica that can then be obtained is generally in the form of a powder.

When a turbine spray dryer is used, the precipitated silica is typically in the form of a powder.

The dried precipitated silica (especially by a turbine spray dryer) or milled as indicated above, may optionally be subjected to an agglomeration step. Said agglomeration step consists, for example, of direct compression, wet granulation (that is to say with the use of a binder such as water, a silica suspension, etc.), extrusion or, preferably, dry compacting. The silica that can then be obtained after the agglomeration step is generally in the form of granules.

The precipitated silica according to the invention can be provided in any physical state, that is to say that it can be provided in the form of substantially spherical beads (microbeads), of a powder or of granules.

It can thus be provided in the form of substantially spherical beads with a mean size of at least 80 μm, preferably of at least 150 μm, in particular of between 150 and 270 μm; this mean size is determined according to the standard NF X 11507 (December 1970) by dry sieving and determination of the diameter corresponding to a cumulative oversize of 50%.

It can also be provided in the form of a powder with a mean size of at least 3 μm, in particular of at least 10 μm, preferably of at least 15 μm.

It can be provided in the form of granules with a size of at least 1 mm, for example of between 1 and 10 mm, in particular along the axis of their greatest dimension.

The precipitated silica according to the present invention or (capable of being) obtained by the process described above according to the invention can be used in numerous applications.

The inventive precipitated silica can be employed, for example, as catalyst support, as absorbent for active materials (in particular support for liquids, especially used in food, such as vitamins (vitamin E) or choline chloride), in polymer, especially elastomer, compositions, as viscosifying, texturizing or anticaking agent, as battery separator component, or as additive for toothpaste, concrete or paper.

However, the inventive precipitated silica finds a particularly advantageous application in the reinforcement of natural or synthetic polymers. The dynamic and mechanical properties of respective polymer compositions are generally maintained unaltered, when not improved, over those of corresponding polymer compositions comprising precipitated silicas of the prior art.

Advantageously, the precipitated silica according to the present invention or obtained by the process according to the invention described above confer to the polymeric (elastomeric) compositions into which they are introduced, a highly satisfactory compromise in properties, in particular a reduction in their viscosity. Preferably, they exhibit a good ability to disperse and to deagglomerate in polymeric, preferably elastomeric, compositions.

The polymer compositions in which it can be employed, in particular as reinforcing filler, are generally based on one or more polymers or copolymers, in particular on one or more elastomers, preferably exhibiting at least one glass transition temperature of between −150° C. and +300° C., for example between −150° C. and +20° C.

The expression "copolymer" is used herein to refer to polymers comprising recurring units deriving from at least two monomeric units of different nature.

Mention may in particular be made, as possible polymers, of diene polymers, in particular diene elastomers.

For example, use may be made of polymers or copolymers deriving from aliphatic or aromatic monomers, comprising at least one unsaturation (such as, in particular, ethylene, propylene, butadiene, isoprene, styrene, acrylonitrile, isobutylene or vinyl acetate), polybutyl acrylate, or their mixtures; mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides.

The polymer (copolymer) can be a bulk polymer (copolymer), a polymer (copolymer) latex or else a solution of polymer (copolymer) in water or in any other appropriate dispersing liquid.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur (vulcanisates are then obtained) or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Use may in particular be made, as coupling agents, as nonlimiting examples, of "symmetrical" or "unsymmetrical" silane polysulfides; mention may more particularly be made of bis(($C_1$-$C_4$)alkoxyl($C_1$-$C_4$)alkylsilyl($C_1$-$C_4$)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

However, this silica according to the invention can optionally be combined with at least one other reinforcing filler, such as, in particular, a commercial highly dispersible silica, such as, for example, Zeosil® Z1165MP or Zeosil® Z1115MP (commercially available from Solvay), a treated precipitated silica (for example, a precipitated silica "doped" using a cation, such as aluminum); another reinforcing inorganic filler, such as, for example, alumina, indeed even a reinforcing organic filler, in particular carbon black (optionally covered with an inorganic layer, for example of silica). The silica according to the invention then preferably constitutes at least 50% by weight, indeed even at least 80% by weight, of the total amount of the reinforcing filler.

The compositions comprising the precipitated silica of the invention may be used for the manufacture of a number of articles. Nonlimiting examples of finished articles comprising at least one of (in particular based on) polymer composition described above (in particular based on the above-mentioned vulcanisates), are for instance of footwear soles (preferably in the presence of a (silica/polymer) coupling agent, for example triethoxysilylpropyl tetrasulfide), floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, battery separators, conveyor belts, transmission belts or, preferably, tires, in particular tire treads (especially for light vehicles or for heavy-goods vehicles (for example trucks)).

EXAMPLES

Example 1 and Comparative Example 1

A silica suspension is prepared according to the process described in WO2010129518A1, Example 1. The suspension of precipitated silica thus obtained is filtered providing a filter cake.

One part of the filter cake is dried (Comp. Example 1).

A second part of the filter cake is subjected to a liquefaction operation in a continuous vigorously stirred reactor in the presence of a solution of 2-methylglutaric acid with an acid content of approximately 34 wt % having a content of at least 90 wt % 2-methylglutaric acid, the remainder acid components being ethylsuccinic acid and adipic acid corresponding to 1.2 wt % of acid, based on the amount of silica introduced.

The disintegrated cake (having a solids content of 22% by weight) is subsequently dried using a nozzle atomizer by spraying through a 1.5 mm nozzle with a pressure of 25 bar for 35 minutes. The final content (C) of polycarboxylic acid and/or carboxylate groups, expressed as total carbon content, in the dried silica is 0.20-0.70 wt %.

Example 2 and Comparative Example 1

In an internal Brabender mixer (380 ml volume) the compositions set forth in Table 1 are prepared. In a first step a thermomechanic treatment at elevated temperatures is performed. This step is followed by a second mechanical treatment at temperatures below 110° C. to add the vulcanization system. The first step is realized in an internal mixer of the Brabender type with a capacity of 380 ml and a degree of filling of 0.6. The initial temperature and the rotor speed are in each case adjusted to achieve a starting temperature in the range of from 140 to 160° C. In the first step the elastomers and the reinforcing filler together with the coupling agent and the stearic acid are introduced. After cooling the mixture to a temperature below 100° C., zinc oxyde and the protective agents (e.g. 6-PPD) are introduced within 2 to 5 minutes. In the second step, after cooling to a temperature of less than 100° C. the vulcanization system (sulphur plus accelerators) is added through a cylindric mixer preheated to a temperature of 50° C. during 2 to 6 minutes. The final composition is calendered to sheets with a thickness of 2-3 mm. The amounts given in Table 1 are in parts by weight.

TABLE 1

| Composition | Comparative Example 2 | Example 2 |
|---|---|---|
| SBR (1) | 103 | 103 |
| BR (2) | 25 | 25 |
| Silica (3) | 80 | |
| Silica (4) | | 80 |
| Coupling agent (5) | 6.4 | 6.4 |
| Nytex 4700 (6) | 7 | 7 |
| Carbon black N330 | 3 | 3 |
| ZnO | 2.5 | 2.5 |
| Stearic acid | 2 | 2 |
| Antioxydant (7) | 1.9 | 1.9 |
| DPG (8) | 1.5 | 1.5 |
| CBS (9) | 2 | 2 |
| Sulfur | 1.1 | 1.1 |

(1) Styrene butadiene rubber solution (Buna VSL 5025-2, obtained from Lanxess) with 50 +/− 4% vinyl groups, 25 +/− 2% styrene groups and a glass transition temperature of −20° C. 100 parts of SBR comprised 37.5 +/− 2.8% of oil
(2) Butadiene rubber (Buna CB 25, obtained from Lanxess)
(3) Product of Comparative Exmple 1
(4) Product obtained in Example 1
(5) TESPT (LUVOMAXX TESPT), a sulphur silane coupling agent obtained from Lehman & Voss France Sarl)
(6) Naphthenic plasticiser oil Nytex 4700, obtained from NynasAB
(7) N-1,3-dimethylbutyl-N-phenyl-p-phenylene diamine (Santoflex 6-PPD from Flexsys)
(8) Diphenyl guanide (Rheonogran DPG 80 from Rhein Chemie)
(9) N-cyclohexyl-2-benzothiazyl-sulfonamide (Rhenogran CBS-80 from Rhein Chemie)

The precipitated silica in accordance with the present invention leads to a reduction of the initial viscosity of the crude mixture compared to the composition with a standard grade silica without acid group content. Furthermore, the viscosity increase over time of the compositions comprising a silica in accordance with the present invention is lower than with the composition of the comparative examples.

A lower initial viscosity and a reduced viscosity increase over time are valuable improvements for the skilled person.

The invention claimed is:

1. Precipitated silica having: a CTAB specific surface in the range of from 50 to 300 $m^2/g$; a BET/CTAB specific surface ratio equal to or greater than 1.3; and a content of polycarboxylic acid and/or respective carboxylate, expressed as total carbon content, of at least 0.15 wt %;
    wherein the polycarboxylic acid and/or carboxylate is selected from malonic acid, tricarballylic acid, glutaric acid, adipic acid, pimelic acid, suberic acid, azelaic acid, sebacic acid, methylsuccinic acid, ethylsuccinic acid, oxalosuccinic acid, methyladipic acid, methylglutaric acid, dimethylglutaric acid, fumaric acid, itaconic acid, muconic acid, aconitic acid, traumatic acid, glutaconic acid, malic acid, tartaric acid, phthalic acid, orthophthalic acid, isophthalic acid, trimesic acid, trimellitic acid and their respective carboxylates, as well as mixtures thereof.

2. The precipitated silica according to claim 1, wherein the at least one polycarboxylic acid is a mixture of polycarboxylic acids.

3. The precipitated silica according to claim 1 having a relative breadth Y of pore size distribution of less than or equal to 3.5.

4. The precipitated silica according to claim 1 having a BET specific surface from 200 to 300 $m^2/g$; a CTAB specific surface from 150 to 250 $m^2/g$;
    and a BET/CTAB specific surface ratio from 1.3 to 1.5.

5. The precipitated silica according to claim 4 having a BET specific surface from 220 to 280 $m^2/g$ and a CTAB specific surface from 180 to 240$m^2/g$.

6. The precipitated silica according to claim 1 having a content of aluminium (Al) of at least 0.30% by weight.

7. The precipitated silica according to claim 1, wherein the at least one polycarboxylic acid is selected from the group consisting of adipic acid, ethylsuccinic acid, glutaric acid, methylglutaric acid, or mixtures thereof.

8. The precipitated silica according to claim 1, wherein the at least one polycarboxylic acid is a mixture comprising 15 to 35 wt % adipic acid, 40 to 60 wt % glutaric acid and 15 to 25 wt % succinic acid.

9. The precipitated silica according to claim 1, wherein the at least one polycarboxylic acid is a mixture comprising 60 to 96 wt% methylglutaric acid, 3.9 to 20 wt % ethyl succinic acid and 0.05 to 20 wt % adipic acid.

10. A composition comprising a precipitated silica of claim 1 and an elastomer or a vulcanizable rubber.

11. An article of manufacture comprising a composition in accordance with claim 10.

12. The article of claim 11, wherein the article is a pneumatic tire or a tire thread.

13. A process for the manufacture of a precipitated silica in accordance with claim 1 or of a suspension thereof, the method comprising the steps of:
    heating an initial solution of aqueous alkali metal silicate having a desired alkaline pH to a desired reaction temperature;
    simultaneously adding an acidifying agent and additional alkali metal silicate solution with agitation to the initial solution while maintaining the alkaline pH and temperature at the desired values;
    discontinuing the addition of alkali metal silicate while continuing the addition of acidifying agent to adjust the pH of a resulting silica suspension to a desired acid value;
    submitting said silica suspension to filtration to provide a filter cake;
    submitting said filter cake to a liquefaction step, optionally in the presence of an aluminum compound, to obtain a suspension of precipitated silica;
    added the at least one polycarboxylic acid to the filter cake during or after the liquefaction step; and
    optionally, drying the precipitated silica obtained after the liquefaction step; wherein the polycarboxylic acid is selected from malonic acid, tricarballylic acid, glutaric acid, adipic acid, pimelic acid, suberic acid, azelaic acid, sebacic acid, methylsuccinic acid, ethylsuccinic acid, oxalosuccinic acid, methyladipic acid, methylglutaric acid, dimethylglutaric acid, fumaric acid, itaconic acid, muconic acid, aconitic acid, traumatic acid, glutaconic acid, malic acid, tartaric acid, phthalic acid, orthophthalic acid, isophthalic acid, trimesic acid and trimellitic acid.

14. The process of claim 13 wherein the at least one polycarboxylic acid is a mixture of polycarboxylic acids.

* * * * *